Patented Nov. 1, 1949

2,486,396

UNITED STATES PATENT OFFICE 2,486,396

GRAIN PREPARATIONS OF HIGH DIASTATIC POWER

Victor L. Erlich, New York, N. Y., assignor to Red Arrow Malting Company, Milwaukee, Wis., a limited partnership composed of Herbert Kurth and Katherine Kurth, both of Milwaukee, Wis.

No Drawing. Application April 6, 1945, Serial No. 587,006

12 Claims. (Cl. 195—64)

This invention relates to grain preparations of high diastatic power and is applicable to the group of cereals described as the Hordeeae families, which comprises wheat, barley and rye. These cereals possess in their raw, mature state a certain but variable amount of active amylase of the saccharifying or so-called beta type. This active amylase, however, represents only a portion, usually less than one half or even less than one third of their potential or total amylase activity or diastatic power. This inactive, water insoluble portion of the total grain amylase can be liberated in a higher or lesser degree upon germination of these grains either in nature or by malting.

It is known that the activation of the latent grain amylase can be done when the grain is finely ground and emulsified in water to which amylase activators are added. Proteolytic enzymes on the one hand, chemical compounds, particularly sulfur compounds of the reducing type such as sulfides or sulfites, and others have been described as activators. Analytical procedures are used to determine the potential total diastatic activity, which are based upon such activation of the finely ground grains in water mashes.

The present invention is based upon extensive experimental work which lead to the discovery that activation of the grain amylase can be obtained in any desired degree in the whole grains without germination on the one hand, or without crushing or milling the grains on the other.

The principal object of the present invention is to provide a whole grain product of high active diastatic activity.

Another object is to provide a novel method of treating whole grains to increase the active diastatic power thereof.

Another object is to provide a method of converting substantially all of the inactive diastase of the raw wheat, barley or rye grain to active diastase without germinating or crushing the grains.

Another object is to greatly shorten the time required and the cost of producing high active diastatic power in whole grains.

In treating grains, in accordance with the present invention, the whole grains without being crushed or milled are steeped in water with additions of diastase activators. After steeping, the steep liquor is separated from the swollen grains and the latter are washed to eliminate adherent compounds that may be undesirable for their use. The wet grains may be dried or kilned and may be stored and shipped for various uses. If desired the grains may be subjected to a short intermediate germination after steeping and washing and before drying.

The steeping of the grains consists in soaking the mechanically cleaned whole grains in the steep water for from a few hours to a usual maximum of approximately two days at suitable temperatures between 10° and preferably below 35° C. Unlike usual steeping practice, the steep water does not have to be changed during the operation. The determination of time and temperature are interdependent and governed by the particular grain being treated and the intended use of the finished product.

Practically all the various chemicals acting as diastase activators and proteolytic enzymes or both can be used, preference being given to those that are substantially soluble or emulsifiable in steeping water. For instance, reducing and/or proteolyzing agents are employed with good success.

As examples, sulfur dioxide, hydrogen sulfide, the various compounds containing or developing these groups, organic and inorganic sulfur compounds and the like can be used. Addition of acids like sulfuric, hydrochloric, lactic, acetic acid and the like has a favorable effect in some cases, especially in view of regulating the pH of the steeping liquid either at the beginning or during the operation. Proteolytic enzymes like pepsinases, proteases and so on may be used in form of commercial papain, pepsin, yeast-autolysates etc.; here, buffering agents like phosphates, calcium sulfate or other salts have their specific importance.

The duration of time of the steeping, necessary to obtain the highest yields of diastase activation depends largely upon the grain being treated, the activator employed and the temperature prevailing in the steep. Higher temperatures accelerate the water absorption of the swelling grain and, accordingly, the reactions necessary to activation. Different steeping times are employed for different grains to obtain the same amount of absorption, largely because of the different form and size of the grain and the quality of the husk and skin. For example, medium sized barley requires approximately twice the time for complete swelling that is required by wheat.

Too long a steeping may result in undesirable leaching out of soluble compounds and soluble or solubilized enzymes and even in partial destruction of diastase. The same is true when too high a temperature is employed for too long a period. Various temperatures may be employed within the suitable range at different periods of the steeping duration.

Increase in the concentration of the activators employed within limits speeds the reactions. Increase of concentration of the activators beyond such limits results in no further increase in the speed of diastase activation and in some instances may be detrimental.

The limits referred to differ with different grains, activators, pH values, temperatures and can readily be determined in each instance by a few comparative tests.

The working conditions influence also the form and the solubility of the grain starch and the grain protein. For example, where greater protein solubilization is desired more emphasis has to be placed on the presence of proteolytic activators and particularly of such enzymes. Where good filtering qualities are required for the finished product the maintenance of the pH value during steeping on the acid side between 3 and 6 has been found to be useful.

Where activation is to be done by both steeping and germination, it is important to be careful as to the activating chemicals to be used, their concentration and other working conditions so that growth factors of the grain are not harmed.

In most cases, it is sufficient and preferable to eliminate the expensive germination procedure and thereby greatly reduce the time and equipment required for malting.

The steeped wet grains can be crushed and used directly in mash treatments wherein the starch and other carbohydrate materials are converted to hexoses and the like, as in the case when using normal green malts.

Where products for storage and shipment are to be prepared the steeped grains are dried or kilned at a temperature of not higher than 50° C. similar to the practice of drying green malt. Slow drying at low temperature sometimes even further increases the content of saccharogenic units in the final product, as determined by the Lintner test or other appropriate assays. The dried grains will have a moisture content between about four and ten per cent and will have an active diastatic power, in Lintner units, approximating and in some instances even higher than that present in a kilned malt of the same grain variety prepared by former steeping and germination practices. The resulting product can be employed for many of the purposes and under the same working conditions as are usual for normal germinated malt. It is obvious that these activated grains can also be used simultaneously or in mixture with normal malt.

The equipment required for the steeping process is readily available in most grain processing plants, malteries, breweries, grain distilleries and the like. Stirring of the steeping grains may be provided for but if done it should be preferably without using aeration. The steeping liquid may be circulated over and through the grains. The usual kilns employed in malt houses for the drying of malts can be used in drying the product of the present invention. Infrared radiation may be employed for drying the product.

Representative test runs on sample grains gave the results tabulated below. In carrying out these tests on the several grain varieties referred to the extract and protein content of the raw grain on a dry basis was first determined. The active diastatic power was determined according to the conventional Lintner test, and the total diastatic potency was determined in Lintner degrees by the usual papain method.

The respective raw grains which had been mechanically cleaned were divided into separate 10 pound batches and each was immersed in 15 gallons of tap water to which the respective activating chemicals and enzymes specified were added. The grains were steeped in these liquids over periods varying from 6 to 72 hours without changing the liquid, the quantity of which had been predetermined so as to furnish the desired complete water absorption by the grain with the swollen grain still under water. The temperature of the steep was maintained at a certain temperature level within the range of from 11 to 30° C. At the end of the chosen steeping times specified the liquid was drained and the grains washed thoroughly and rapidly with pure tap water. The wet grains were then dried in an open air kiln within a temperature range of 35 to 45° C. down to a moisture content of 7 to 10% and average samples of the dried grains taken for analysis. Comparative tests were performed also on samples taken from the washed wet grains before drying. The results in Lintner degrees were in good accordance, with the wet grains giving in some cases figures of slightly lower values than that for the dried grains. The results tabulated below are for tests on the dried material.

Example 1

Batches of a North Dakota hard spring wheat containing 75.7% extract and 17.5% total protein on a dry basis were treated as described within a temperature range of 17 to 19° C. and gave the following results:

| Activator used | Percent of liquid | Duration of Steep, Hours | pH | Diastatic Power | | |
| --- | --- | --- | --- | --- | --- | --- |
| | | | | Total °L | Active | |
| | | | | | °L. | Percent of Total |
| Raw Grain | | | | 202 | 85.5 | 42.5 |
| (a) nil | nil | 24 | 6.4 to 4.0 | 212 | 110 | 52 |
| (b) $Na_2SO_3$ | 0.6 | 24 | 7.8 to 6.4 | 208 | 140 | 67 |
| (c) $Na_2SO_3$ / $NaHSO_3$ | 0.6 / 0.6 | 40 | 7.3 to 6.6 | 213 | 159 | 74.5 |
| (d) $Na_2SO_3$ / Papain | 0.6 / 0.3 | 24 | 7.6 to 6.4 | 203 | 157 | 75.5 |
| (e) $Na_2SO_3$ / Papain | 1.5 / 0.3 | 46 | 8.1 to 6.6 | 206 | 189 | 91.5 |

The first figure in the column headed "pH" represents the pH at the beginning of the steep, and the second figure in each instance represents the pH at the end of the steep. The difference between the figures in each instance represents the effective change in pH during the treatment.

Example 2

Batches of another hard wheat variety grown in Minnesota and containing 81.1% extract and 18.1% total protein on a dry basis, were treated

| Activator used | Per cent of liquid | Duration of Steep, hours | pH | Diastatic Power | | |
|---|---|---|---|---|---|---|
| | | | | Total °L. | Active | |
| | | | | | °L. | Per cent of Total |
| Raw Grain | | | | 211 | 63.5 | 30 |
| (a) nil | nil | 48 | 7.2 to 4.7 | 221 | 80 | 36 |
| (b) Papain | 0.3 | 47 | 6.4 to 4.3 | 223 | 109 | 49 |
| (c) Papain | 1.0 | | | | | |
| Ca(H$_2$PO$_4$)$_2$ | 1.0 | 47 | 4.8 to 3.7 | 215 | 133 | 62 |
| (d) Na$_2$S | 0.5 | | | | | |
| Acetic Acid | 0.5 | 47 | 6.9 to 6.9 | 216 | 176 | 81.5 |
| (e) Na$_2$SO$_3$ | 3.0 | | | | | |
| Acetic Acid | 0.25 | 47 | 6.8 to 6.8 | 199 | 180 | 90.5 |
| (f) Na$_2$SO$_3$ | 2.0 | | | | | |
| HCl | 0.25 | 53 | 6.6 to 6.1 | 188 | 184 | 98 |
| Papain | 0.3 | | | | | |
| (g) CaSO$_3$ | 2.0 | | | | | |
| HCl | 0.25 | 53 | 5.7 to 5.9 | 198 | 185 | 93.5 |
| Papain | 0.3 | | | | | | under similar conditions within a temperature range of 17 to 19° C.

Example 3

Batches of one rye variety containing 74.1% extract and 12.6% total protein on a dry basis and of one barley variety containing 65.3% extract and 13.1% total protein, were treated under similar conditions at 17° C.; the resulting dried grains gave the following results:

| Activator used | Per cent of liquid | Duration of Steep, hours | pH | Diastatic Power | | |
|---|---|---|---|---|---|---|
| | | | | Total °L. | Active | |
| | | | | | °L. | Per cent of total |
| Rye, Raw Grain | | | | 108 | 72.5 | 67 |
| (a) nil | nil | 47 | 6.8 to 4.2 | 112 | 79 | 70.5 |
| (b) Na$_2$S | 0.7 | | | | | |
| Acetic Acid | 0.5 | 23 | 8.0 to 7.2 | 91.5 | 82 | 89.5 |
| Papain | 0.3 | | | | | |
| (c) Na$_2$SO$_3$ | 2.0 | 72 | 7.0 to 6.9 | 100 | 95.5 | 95.5 |
| Papain | 0.3 | | | | | |

| Activator used | Per cent of liquid | Duration of Steep, hours | pH | Diastatic Power | | |
|---|---|---|---|---|---|---|
| | | | | Total °L. | Active | |
| | | | | | °L. | Per cent of total |
| Barley, Raw Grain | | | | 142 | 66 | 46.5 |
| (a) nil | nil | 53 | 7.0 to 6.5 | 124 | 61 | 49 |
| (b) K$_2$S$_2$O$_3$ | 2.0 | 47 | 4.0 to 4.6 | 119 | 90 | 75.5 |

Example 4

The following experimental data are given to demonstrate the influence of both temperature during the steeping operation and its duration.

The following figures refer to batches of the same wheat variety as recorded in Example 2.

| Activator used | Per cent of liquid | Temperature, °C. | Duration of Steep, hours | pH | Diastatic Power | | |
|---|---|---|---|---|---|---|---|
| | | | | | Total °L. | Active | |
| | | | | | | °L. | Per cent of total |
| Raw Grain | | | | | 211 | 63.5 | 30 |
| (a) K$_2$S$_2$O$_3$ | 3.0 | 11 | 24 | 2.5 to 3.4 | 200 | 128 | 64 |
| HCl | 0.15 | | 47 | 2.5 to 3.7 | 185 | 174 | 94 |
| (b) K$_2$S$_2$O$_3$ | 1.5 | 18 | 17 | 3.3 to 4.6 | 211 | 184 | 87.5 |
| Acetic Acid | 0.15 | | 24 | 3.3 to 4.7 | 192 | 172 | 89.5 |
| | | | 47 | 3.3 to 4.8 | 179 | 167 | 93.5 |
| (c) Na$_2$SO$_3$ | 1.5 | 18 | 24 | 8.3 to 7.5 | 209 | 133 | 63.5 |
| Papain | 0.3 | | 48 | 8.3 to 7.3 | 191 | 167 | 87.5 |
| (d) Na$_2$SO$_3$ | 1.5 | 30 | 22 | 8.4 to 7.0 | 189 | 158 | 83.5 |
| Papain | 0.3 | | 48 | 8.4 to 4.8 | 189 | 179 | 94.5 |

The whole grain treated in accordance with the present invention has close to 100% of its diastatic potency in active form. The yield obtained by the process of the invention is substantially greater than that obtainable heretofore by any process of malting grains; the respiration loss and the loss due to rootlets and the like and which amount to from 10 to 15% of the weight of the original grain (on a dry basis), is substantially eliminated. The over all time and the production cost are greatly reduced when compared with those required for the production of normal germinated malt. The product has practically the same over all composition as the raw grain since the chemicals used for the activation are removed. It can be employed in most cases like usual malt of comparable diastatic power.

I have described what I believe to be the preferred practice of my invention. I do not wish, however, to be confined to the specific practice shown but what I desire to cover by Letters Patent is set forth in the appended claims.

I claim:

1. The process of transforming inactive diastase into active diastase in whole cereal grains of the Hordeeae families, comprising wheat, barley and rye prior to any breaking of the grains and prior to germination, comprising steeping the whole grain seeds in steep water containing amylase activators until the grains have reached an active diastatic power of at least 80% of their potential total diastatic power.

2. The process of transforming inactive diastase into active diastase in whole cereal grains of the Hordeeae families, comprising wheat, barley and rye prior to any breaking of the grains and prior to germination, comprising water steeping the whole grain seeds in the presence of water soluble chemical compounds which constitute amylase activators until the grains have reached an active diastatic power of at least 80% of their potential total diastatic power.

3. The process of transforming inactive diastase into active diastase in whole cereal grains of the Hordeeae families, comprising wheat, barley and rye prior to any breaking of the grains and prior to germination, comprising water steeping the whole grain seeds in the presence of proteolytic enzymes which act as amylase activators until the grains have reached an active diastatic power of at least 80% of their potential total diastatic power.

4. The process of transforming inactive diastase into active diastase in whole cereal grains of the Hordeeae families, comprising wheat, barley and rye prior to any breaking of the grains and prior to germination, comprising water steeping the whole grain seeds in the presence of proteolutic enzymes and of water soluble chemical compounds constituting amylase activators to activate both the proteolytic and amylolytic potentialities of the grains until the grains have reached an active diastatic power of at least 80% of their potential total diastatic power.

5. The process of transforming inactive diastase into active diastase in whole cereal grains of the Hordeeae families, comprising wheat, barley and rye prior to any breaking of the grains and prior to germination, comprising water steeping the whole grain seeds in the presence of a sulfite compound in an amount corresponding to $SO_2$ concentrations of from about one-half to about three grams per one hundred milliliters of steep liquor under conditions of temperature selected from the range of about 10° C. to below 35° C. and of pH higher than 3 until the diastatic activity of the grains is at least 80% of their potential total diastatic power.

6. The process of transforming inactive diastase into active diastase in whole cereal grains of the Hordeeae families, comprising wheat, barley and rye prior to any breaking of the grains and prior to germination, comprising water steeping the whole grain seeds in the presence of proteolytic enzymes of the papain type in concentrations corresponding to at least .2 gram of papain per 100 milliliters of steep liquor and of added buffering agents to maintain the pH within a range of from 2 to about 8.5, until the diastatic activity of the grains is at least 80% of their potential total diastatic power.

7. The process of transforming inactive diastase into active diastase in whole cereal grains of the Hordeeae families, comprising wheat, barley and rye prior to any breaking of the grains and prior to germination, comprising water steeping the whole grain seeds in the presence of amylase activators until the grains have reached an active diastatic power of at least 80% of their potential total diastatic power, and thereafter separating the whole grains from the steep liquor to terminate the steeping treatment and provide whole wet grains of increased diastatic activity as determined in degrees Lintner.

8. A substantially non-germinated whole grain product of cereals belonging to the Hordeeae families comprising wheat, barley and rye, which in their raw state have a substantial amount of inactive amylase, comprising whole grains in which at least 80% of their potential total diastatic power are activated as measured by the usual Lintner test.

9. A substantially non-germinated whole wheat grain product, comprising whole wheat grains of an active amylase content which is in excess of 80% of their potential total diastatic power as measured by the usual Lintner test.

10. A substantially non-germinated whole barley grain product, comprising whole barley grains of an active amylase content which is in excess of 80% of their potential total diastatic power as measured by the usual Lintner test.

11. A substantially non-germinated whole rye grain product, comprising whole rye grains of an active amylase content which is in excess of 80% of their potential total diastatic power as measured by the usual Lintner test.

12. The process of transforming inactive diastase into active diastase in whole cereal grains of the Hordeeae families, comprising wheat, barley and rye prior to any breaking of the grains and prior to germination, comprising water steeping the whole grain seeds in the presence of amylase activators until the diastatic activity of the grains is at least 80% of their potential total diastatic power, separating the whole grains from the steep liquor to terminate the steeping treatment, and thereafter drying the grains at a temperature below about 60° C. to provide whole dry grains having a substantially greater diastatic activity than that of the raw grains as determined in degrees Lintner.

VICTOR L. ERLICH.

(References on following page)

REFERENCES CITED

The following references are of record in the file of this patent:

UNITED STATES PATENTS

| Number | Name | Date |
|---|---|---|
| 1,955,112 | Curry | Apr. 17, 1934 |
| 2,228,717 | Bergquist | Jan. 14, 1941 |
| 2,368,668 | Langford et al. | Feb. 6, 1945 |

OTHER REFERENCES

Dull et al.: "The Nature of the Liberation of Bound Barley Amylase as Effected by Salt Solutions," Cereal Chemistry 18 (1941), pages 113–20.

Chemical Abstracts 30: 4881 (2) Chrzaszcz and Janicki, "Increase in the amount of active amylase in ungerminated cereals by means of H. S."

Chemical Abstracts 30: 1076 (2) Chrzaszcz and Janicki, "Protease action on protein of ungerminated cereal grain and its effect on the amylolytic power."

Sumner et al.: Enzymes, Academic Press Inc., New York, N. Y. 1943, p. 82.

Balls and Tucker: Food Industries, June 1944, page 102 (vol. 16, No. 6, vol. page 471).